Nov. 20, 1934.    A. M. THOMSON    1,981,399
ADJUSTABLE THREADED MEMBERS AND MEANS FOR LOCKING SAME
Filed Dec. 11, 1931

INVENTOR
ALFRED M. THOMSON
BY
ATTORNEYS

Patented Nov. 20, 1934

1,981,399

UNITED STATES PATENT OFFICE 1,981,399

ADJUSTABLE THREADED MEMBERS AND MEANS FOR LOCKING SAME

Alfred Morris Thomson, East Orange, N. J., assignor to Dardelet Threadlock Corporation, New York, N. Y., a corporation of Delaware Application December 11, 1931, Serial No. 580,304

3 Claims. (Cl. 85—1)

Important objects of the present invention are, to provide improved means for holding a ball race in properly adjusted relation to a companion race, and to provide improved means for holding the ball races of a bicycle wheel mounting in proper adjustment.

Other objects of the invention will appear hereinafter.

Figure 1:
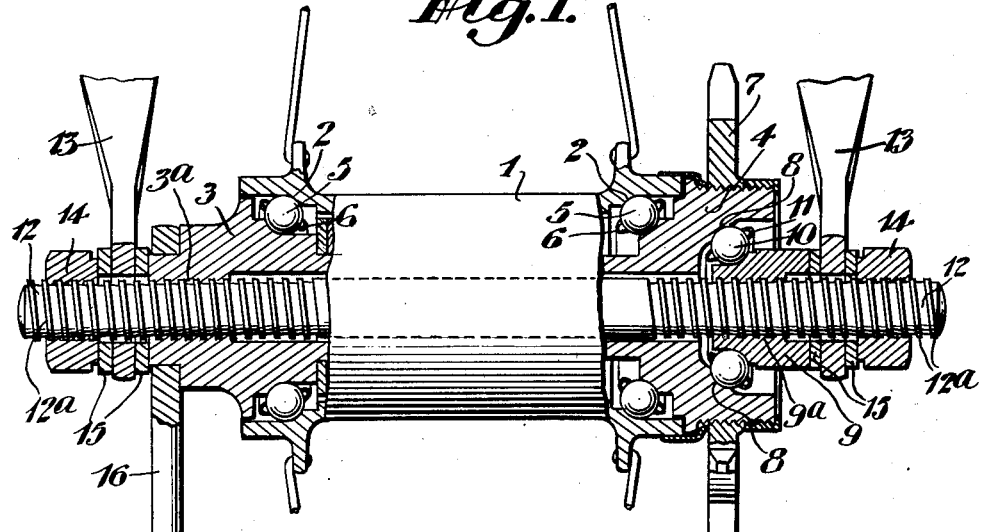
Figure 2:
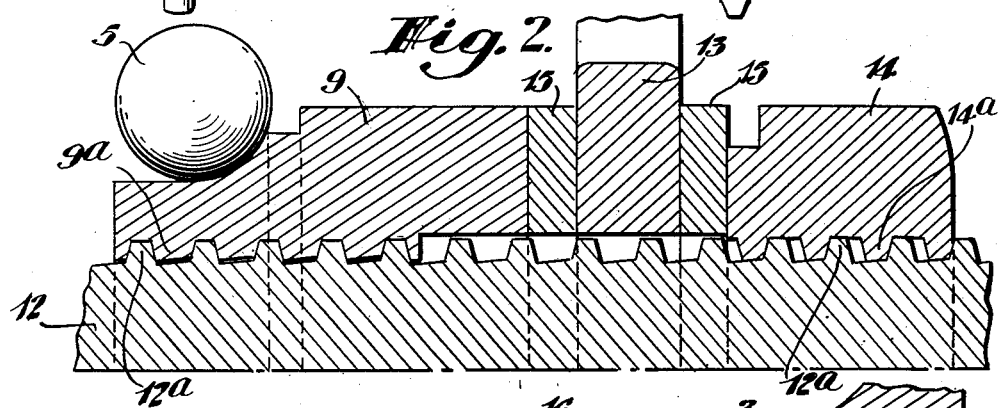
Figure 3:
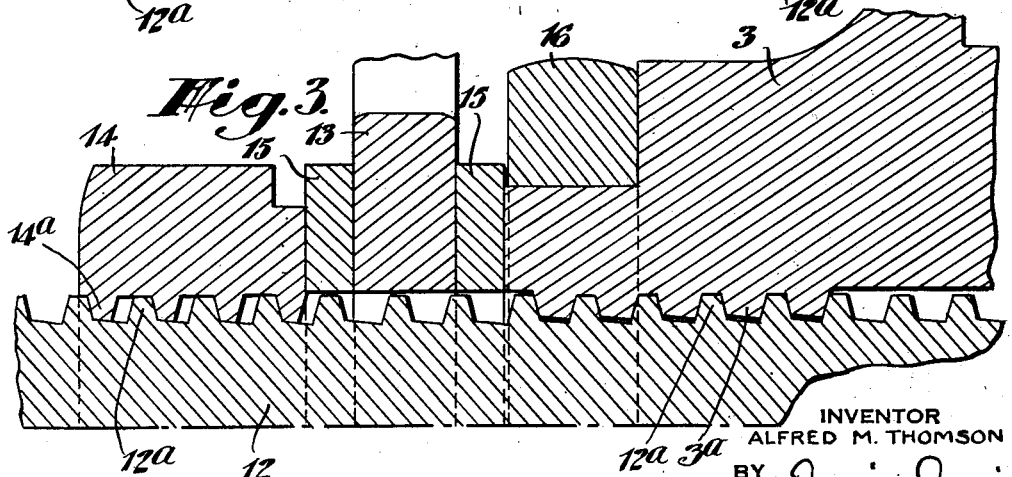

In the drawing, Fig. 1 is a view, partly in longitudinal section, of a bicycle wheel mounting;

Fig. 2 an enlarged detail longitudinal sectional view of the ball race at one end of the wheel hub, and associated parts for holding the race adjusted; and Fig. 3 an enlarged detail longitudinal sectional view of the ball race at the opposite end of the wheel hub, and associated parts for holding said race adjusted.

As shown in Fig. 1, my invention is embodied in the rear wheel mounting of a bicycle. The invention may, however, be employed advantageously in other embodiments. In general the wheel mounting shown is of a standard type employed in both foot driven bicycles and motorcycles. My invention provides for positive maintenance of the hub bearings in proper adjustment so that the wheel will run properly.

The wheel hub includes the usual tubular section or shell 1 having the ball raceways 2 within its opposite ends. Two race members or cones 3 and 4 project into the opposite ends of the shell and have raceways obliquely opposed to the raceways 2. Interposed between the opposed raceways are balls 5 caged in retaining rings 6. The cone 4 is in effect a section of the hub and it is externally threaded and has the sprocket wheel 7 screwed upon it. At its outer end the cone 4 is concave and defines a raceway 8. A smaller axle-adjusting cone or race member 9 projects into said concave end and defines a raceway obliquely opposed to the raceway 8. Balls 10 are interposed between said opposed raceways and are caged in a retaining ring 11. An axle 12 extends through the shell 1 and through the cones 3, 4 and 8 and is threaded, as at 12$^a$, from its ends inward for a material distance. The cone 3 at one end of the hub and the smaller cone 9 at the opposite end of the hub have internal threads 3$^a$ and 9$^a$ respectively and are screwed upon the axle for axial adjustment. Outward of the cones 3 and 9 are the axle-supporting legs 13 of the bicycle frame having apertures or forks through which the ends of the axle extend. Outward of said legs, nuts 14 are screwed upon the axle ends. Interposed between the nuts and the axle-supporting legs and also between the latter and the adjacent cones or race members are washers 15. The outer end of the cone 3 is reduced and has the usual brake arm 16 keyed thereto at one end and having its opposite end secured, by means not shown, to the bicycle frame. The hub shell 1 houses the usual coaster brake means, not shown.

For maintaining the race members in proper adjustment I have provided threaded connections of one character between the axle and the race members 3 and 9, and threaded connections of another character between the axle and the nuts 14. These different threaded connections are designed for cooperation to hold the race members securely locked in their adjusted positions upon the axle. Referring first to the threaded connections between the nuts and the axle, the engaged threads 12$^a$ and 14$^a$ of the axle and nuts, respectively, are complementary threads of equal and constant pitch and are of the well-known Dardelet type of screw threads shown in United States Patent No. 1,657,244. The crest of the nut thread 14$^a$ and the root of the axle thread 12$^a$ slope inward and make an angle of preferably six degrees with the thread axis, this angle being within the angle of friction of the metal or metals of the axle and nut. The ribs of the threads are much narrower than the grooves, so that the threads are relatively displaceable crosswise in an axial direction for self-locking mutual engagement of said sloping surfaces. The threads also have opposed, coacting abutment side faces making an abrupt angle to the axis to positively limit crosswise displacement of the threads.

The threaded connections between the race members 3 and 9 and the axle 12 are designed to prevent relative crosswise displacement of the engaged threads. The threads 3$^a$ and 9$^a$ of the race members engage the same axle threads engaged by the nut threads but they are of different design from the latter. Each of said threads 3$^a$ and 9$^a$ has wide ribs formed for close crosswise fitting within the wide groove of the engaged axle thread. This prevents crosswise relative displacement or play between the threads and thereby enables the race members to be accurately adjusted axially by turning them upon the axle. In the present instance the crest surfaces of the threads 3$^a$ and 9$^a$ are inclined similarly to the root surfaces of the axle threads. Said crest surfaces may be formed differently, however.

When the race members 3 and 9 have been properly adjusted they are locked in adjustment by tightening the nuts 14. The nuts are screwed against the adjacent washers 15 to force the legs 13 inward and press the inner washers against the race members which serve as stops to limit the axial advance of the nuts. Then, upon further turning of the nuts without axial advance their threads are displaced crosswise outward relatively to the axle threads and the inclined crest surfaces of the nuts are jammed into self-locking frictional engagement with the inclined root surfaces of the axle threads. Thereby the nuts are firmly held against accidental unscrewing and the nuts and the race members 3 and 9 are held firmly bound to the legs 13 through the interposed washers 15. Thus accidental relative movement between the axle and race members is prevented and the adjustment of the race members is maintaind. In the adjustment of the race members the legs 13 will flex sufficiently to accommodate them to the adjustments.

It is common practice in this class of devices to engage the frame members 13 directly with the outer raceways 3, 9 by slabbing off the outer ends of the raceways so as to fit within slots or notches in the lower ends of the frame members to thereby utilize the frame members to prevent the raceway members from turning after they are once adjusted. This construction has two disadvantages, first, it obviously prevents a nice adjustment of the raceway member, and secondly, requires removal of the wheel from the frame for readjusting the raceway members. With my invention it is possible to do away with this expedient for locking the raceway members. With my invention it is not necessary to slab off the projecting ends of the raceway members 3, 9, as the locking means I have provided insure the raceway members being fixed in their adjusted positions without the assistance of the frame members. I may, as shown, simply clamp the frame members between the lock nuts 14 and the extreme outer ends of the raceway members 3, 9, thus not only providing for a nice adjustment of the raceway members but also enabling the raceway members to be adjusted in situ, that is, without removing the wheel from the frame. To adjust the raceway members 3, 9 it is simply necessary to slightly loosen the nuts 14 and then by means of the fingers or a wrench applied to the projecting ends thereof, screw them inwardly or outwardly; and when a precise adjustment is obtained the raceway members are positively locked in that precise adjustment by retightening the nuts 14.

What I claim is:

1. In combination, a member having an external screw thread, a member having an internal screw thread screwed on said external thread for relative adjustment therealong, and a locking member to hold a relative adjustment between said externally threaded member and said relatively adjustable member and provided with an internal screw thread screwed on said external thread and having a thread rib whose width in cross section is no more than two-thirds of that of the groove of the external thread to permit substantial crosswise displacement of one thread on the other in an axial direction upon relative screw-tightening rotation without axial advance, and the external thread and locking member thread having coacting locking surfaces formed for mutual self-locking engagement upon said crosswise displacement, the rib of the thread of said relatively adjustable member being wider in cross section than the thread rib of the locking member to fit closely crosswise in the groove of the external thread.

2. In combination, a member having an external screw thread, a member having an internal screw thread screwed on said external thread for relative adjustment therealong, and a locking member on said externally threaded member to bind said relatively adjustable member in an adjustment by endwise thrust and provided with an internal thread screwed on said external thread and having a thread rib substantially narrower than the thread groove of the external thread to permit predetermined substantial crosswise displacement of one thread on the other in an axial direction upon relative screw-tightening rotation without axial advance, the external thread having a helicoidal root locking surface inclined with reference to the thread axis and abrupt side faces to positively limit said crosswise displacement, and the crest of the rib of the locking member thread having a helicoidal locking surface at its crest substantially narrower than said root locking surface, to frictionally engage said root locking surface upon said predetermined crosswise displacement and lock the threads together, the external thread being uniform throughout its engagement with said two internal threads and the thread rib of the relatively adjustable member being wide enough to fit closely crosswise in the groove of the external thread.

3. An adjustable and lockable screw threaded connection comprising an externally threaded member having a Dardelet external thread of uniform and constant pitch and of uniform profile throughout its complete thread length, an adjustable member internally threaded to receive the externally threaded member and provided with an internal thread of uniform and constant pitch and of uniform profile throughout its complete thread length and adapted to receive and closely fit the thread of the externally threaded member to permit accurate adjustment by relative rotation of the two parts and to prevent axial play between the two parts, and a locking nut member internally threaded to receive the externally threaded member, the internal thread of the locking member being a Dardelet thread having the same pitch as the thread of the externally threaded member and having a profile cooperating with the thread of the externally threaded member to cause it to frictionally lock at any point in its rotation and at any point on said externally threaded member by forcible rotation when its advance is arrested by the internally threaded adjustable member.

ALFRED MORRIS THOMSON.